United States Patent [19]

Crace

[11] Patent Number: 4,787,914

[45] Date of Patent: Nov. 29, 1988

[54] BRIQUET FOR GAS AND ELECTRIC GRILLS

[75] Inventor: Robert J. Crace, Brentwood, Tenn.

[73] Assignee: Crace Associates, Inc., Ocala, Fla.

[21] Appl. No.: 56,589

[22] Filed: Jun. 1, 1987

Related U.S. Application Data

[63] Continuation-in-part of Ser. No. 20,760, Mar. 2, 1987, abandoned.

[51] Int. Cl.⁴ ............................ C10L 5/12; C10L 5/40
[52] U.S. Cl. ..................................... 44/16 A; 44/15 C; 126/25 R
[58] Field of Search ................... 44/16 A, 26, 15 C; 126/25 R

[56] References Cited

U.S. PATENT DOCUMENTS

| | | | |
|---|---|---|---|
| 308,714 | 12/1884 | Gülpen | 44/16 A |
| 418,316 | 12/1889 | Gathemann | 44/522 |
| 2,017,402 | 10/1935 | Komarek et al. | 44/15 C |
| 3,089,760 | 5/1963 | Jaffe | 44/41 |
| 3,485,599 | 12/1969 | Richardson et al. | 44/16 R |
| 3,709,700 | 1/1973 | Ross | 44/6 |
| 3,812,840 | 5/1974 | Whaler | 126/25 R |
| 4,102,653 | 7/1978 | Simmons et al. | 44/16 R |
| 4,434,781 | 3/1984 | Koziol | 126/25 R |

FOREIGN PATENT DOCUMENTS

| 87539 | 6/1982 | Japan | 126/25 R |
|---|---|---|---|
| 7677 | of 1888 | United Kingdom | 44/26 |

*Primary Examiner*—Carl F. Dees
*Attorney, Agent, or Firm*—Richard E. Jenkins

[57] ABSTRACT

A combustible briquet is provided having a clay carrier for the flavor producing carbonaceous and/or fibrous materials which prevents the briquet from flaking or otherwise disintegrating during the combustion process so as to allow for gas and electric grill convenience with charcoal briquet flavor.

34 Claims, No Drawings

BRIQUET FOR GAS AND ELECTRIC GRILLS

RELATED APPLICATIONS

This application is a continuation-in-part application of Ser. No. 020,760 filed Mar. 2, 1987 and now abandoned, entitled "Briquet for Gas and Electric Grills".

Technical Field

The present invention relates to combustible briquets of the type used for cooking various kinds of meat in a manner generally known as barbecuing. More particularly, the present invention relates to a combustible briquet providing excellent flavor producing characteristics and which does not shed ash as it burns so as to lend itself to use in gas grills, electric grills, and the like. The briquet of the present invention consists essentially of a relatively high percentage by weight of a clay carrier and at least one combustible flavor producing agent such as a carbonaceous material, a fibrous material or a mixture thereof.

BACKGROUND ART

Briquets, commonly called "charcoal briquets", comprising combustible carbonaceous material are used extensively for cooking various kinds of meat and other foods on a grill in a manner generally known as barbecuing. When meat or other foods are cooked by barbecuing, the food is typically placed on a grill which is provided over a bed of charcoal or charcoal and wood briquets. The resulting barbecue taste imparted to the meat or other foods cooked on the grill is due in part to the dry type of heat provided by the briquets and also in large measure due to the flavor imparted to the food by the combustion of the charcoal or charcoal and wood in the briquet. Typically, the wood within a briquet (normally in the form of sawdust) provides an aromatic smell and flavor to meat being barbecued and the charcoal within a briquet provides a distinctive charcoal flavor to the meat.

As is known in the art, conventional briquets utilized to barbecue meat or other foods tend to shed ash as they burn and are therefore not suitable for use in a gas or electric grill since the ash would be detrimental to the grill. This has resulted in the use of what is commonly called "lava rock" in lieu of charcoal briquets in gas and electric grills. The lava rock tend to last indefinitely but do not inherently provide any flavor to the meat or other foods being barbecued thereon. In the process of barbecuing on the grill, the only flavor imparted by the lava rock is due to smoke and vapors produced by the fats of the meat or barbecue sauce thereon which tend to fall down through the grill onto the lava rock and be vaporized. The distinctive charcoal flavor associated with barbecuing on a conventional grill is not present in a gas or electric grill utilizing lava rock as "briquets" and a primary heat source other than the lava rock.

The present invention overcomes the deficiencies of lava rock as a flavor producing material while maintaining its non-shedding character by providing a briquet comprising a clay carrier incorporating carbonaceous material and/or fibrous material therein as flavor producing agents. The clay carrier maintains the integrity of the briquet during combustion and leaves only a hard shell residue after complete combustion of the flavor agents. Although the use of clay as an element in a briquet composition is known in the art of briquet manufacturing, all use known by applicant to date has been in relatively small percentage amounts by weight and for different purposes than that achieved in the instant invention.

For example, U.S. Pat. No. 4,167,398 discloses a charcoal briquet utilizing an inexpensive binding composition consisting of sodium bentonite clay and a water soluble acid polymer which apparently makes up about one percent to ten percent by weight of the charcoal briquet. Also, U.S. Pat. No. 3,485,599 discloses the use of about three percent to four percent by weight of bentonite clay in a rapid ignition charcoal briquet as a retarder to prevent the briquet from burning too rapidly after ignition or from igniting spontaneously.

Another prior art patent is U.S. Pat. No. 3,689,234 which discloses an instantly ignitable charcoal briquet utilizing about 8 percent to 12 percent by weight of a clay such as bentonite, kaolin and the like as a combustion buffer to regulate the ignition of the readily ignitable charcoal briquet. Still, another use of clay in a charcoal briquet is disclosed in U.S. Pat. No. 3,402,033 wherein about 1 to 15 percent by weight of a non-hydratable clay is utilized in the briquet composition to prevent plugging of a die face during extrusion of the composition prior to its formation into a briquet.

Therefore, although it is known to utilize a small percentage by weight of clay in a charcoal briquet composition for a variety of purposes, applicant is not aware of a briquet composition utilizing the high percentage by weight of clay utilized in the instant invention as a carrier. Moreover, applicant is not aware of any prior art briquet which utilizes clay in the manner described herein to provide a flavor producing briquet which lends itself to use in gas and electric grills since it does not shed ash as do conventional charcoal briquets.

DISCLOSURE OF THE INVENTION

In accordance with the present invention, applicant provides a new briquet which can be used in gas grills, electric grills and the like to provide the flavor of a conventional charcoal-type briquet while not shedding ash as it burns. In this fashion, the novel briquet of the instant invention allows for the convenience of gas and electric grilling while still providing the charcoal or charcoal and wood flavor associated with conventional charcoal briquet barbecue grilling.

The briquet of the present invention comprises from 30–80 percent by weight of a clay carrier and from 20–70 percent by weight of at least one combustible flavor producing material. Various types of clays may be employed in accordance with the invention, although it is presently preferred to use either hydrated montmorillonite or ball clay. The combustible flavor producing material may be either a carbonaceous material such as charcoal or coal or a fibrous material such as hickory (and other wood sawdust and chips) as well as spices, spice hulls and nut shells. Also, the present invention contemplates that mixtures of the carbonaceous material and the fibrous material may be combined with the clay carrier.

A representative combustible briquet according to the present invention would consist essentially of about 50 percent by weight of hydrated montmorillonite clay, 25 percent by weight of charcoal and 25 percent by weight of hickory (sawdust or chips). In this particular briquet, the hickory and charcoal would provide wood and charcoal flavor to the meat or other food being barbecued on a gas grill. This flavor, of course, would not be attainable from conventional lava rock briquets typically found in gas grills, electric grills and other grills utilizing a heat source other than the briquets. Moreover, due to the high percentage of clay within the briquet it will not shed ash like a conventional briquet. The shedding of ash would, of course, tend to foul a gas, electric or other grill having a self-contained primary heat source.

The novel briquets should burn for about 10 hours or so before the entirety of the carbonaceous and/or fibrous material therein is combusted leaving a hard, porous clay briquet which may be left in the grill and utilized indefinitely as a non-charcoal flavor producing substitute for conventional lava rock. If additional flavor is desired, several or all of the ceramic shells may be removed with tongs and replaced with new combustible briquets to enhance or restore the flavor producing capability of the briquet bed.

Accordingly, it is the primary object of the present invention to disclose and provide a combustible briquet, useful in barbecuing on a gas or electric grill, which provides the charcoal or charcoal/wood flavor of a conventional briquet but which does not create the ash associated with conventional briquets.

Another object of the present invention is to disclose and provide a novel briquet which will function as a substitute for lava rock after the flavor producing charcoal or charcoal/wood material therein is fully combusted.

Still another object of the present invention is to provide a combustible briquet which forms a hard ceramic shell when the combustible flavor producing carbonaceous and/or fibrous materials are fully and completely burned.

Still another object of the present invention is to provide a briquet which will allow the user of a gas or electric barbecue grill to enjoy the convenience of the grill while still enjoying the flavor of conventional charcoal briquets.

Other objects of the present invention will be apparent from the following detailed description wherein all parts and percentages are by weight unless specifically indicated otherwise.

BEST MODE FOR CARRYING OUT THE INVENTION

The present invention, as noted above, is a combustible briquet for use in gas and electric grills which provides charcoal or charcoal and wood flavor to food being barbecued on the grill but which does not tend to shed ash due to a high percentage of clay used as a carrier for the combustible, flavor producing materials.

First of all, applicant would like to observe that a conventional charcoal briquet would typically consist essentially of about 40 percent charcoal, 20 percent limestone, 10 percent starch, and 30 percent of either lignite or anthracite coal. This type of briquet normally has about 10,000 B.t.u. of heat and would be used in a conventional barbecue grill as a heat source. The charcoal serves to provide dry heat and flavor to meat or other foods being grilled, the limestone serves as a catalyst for the heat, the starch serves as a binder for the briquet composition, and the coal serves as a heat source. Also, it is known to provide about 2 percent nitrate as an oxidizer to facilitate burning and 0.5 percent borax as a slicking agent for a charcoal briquet.

The conventional charcoal briquet is utilized in barbecue grills as both the source of heat and flavor for barbecue cooking of meat and other foods. Its shortcoming is that it cannot practically be used in a gas or electric grill since it will turn to ash and be detrimental to proper functioning of the grill. Of course, this ash is not of concern in a conventional grill since it is merely discarded when it becomes too voluminous. Prior to that time, it serves as an advantageous bed for charcoal briquets utilized in barbecue grilling.

The combustible briquet of the instant invention is unique in that unlike lava rock normally utilized in a gas or electric grill, it includes combustible flavor producing material within a clay carrier which serves to form a hard shell and prevent the flaking of ash during the combustion process. In other words, the combustible briquet of the instant invention provides the flavor of conventional charcoal briquets but does not possess the characteristic tendency of a conventional briquet to break down or form ash during the combustion process. Although gas and electric grills are discussed herein, it should be understood that the combustible briquet is intended for use with any grill utilizing a self-contained heat source such as a gas grill, electric grill, oil grill and the like.

The combustible briquet of the instant invention comprises from about 30 percent to 80 percent by weight of clay and from about 20 percent to 70 percent by weight of at least one combustible flavor producing material. The clay may be of a number of types including hydrated montmorillonite, Western bentonite, kaolinite, and ball clay. The combustible flavor producing material may be a carbonaceous material such as charcoal, lignite coal or anthracite coal, or mixtures thereof. Also, the combustible material may be a fibrous material such as oak, hickory, mesquite, maple, alder, cherry, and sassafras wood in addition to spice hulls, nut shells, spices, and mixtures of all of the foregoing fibrous materials. The combustible flavor producing material within the briquet of the instant invention may also be a mixture of the aforementioned carbonaceous material and fibrous material.

A preferred briquet composition consists essentially of hydrated montmorillonite clay, charcoal derived from hickory wood, and hickory wood sawdust or chips wherein the clay comprises at least 50 percent by weight of the composition. Two preferred briquet compositions are set forth below for a better understanding of the invention. The compositions are manufactured and the briquets produced according to conventional means known to those skilled in the charcoal briquet manufacturing art.

EXAMPLE 1

| | Percent |
|---|---|
| Hydrated montmorillonite clay | 50% |
| Charcoal (derived from hickory sawdust) | 50% |

EXAMPLE 2

| | Percent |
|---|---|
| Hydrated montmorillonite clay | 50% |
| Charcoal (derived from hickory sawdust) | 25% |
| Hickory (sawdust or chips) | 25% |

It is possible to substitute for any of these preferred elements from the substitutes therefor set forth above and to vary the relative weight percentages. However, the preferred compositions described above have been found to be particularly effective in providing flavor to meat or other food being barbecued on a gas or electric grill and in not allowing any flaking of ash during the combustion of the flavor producing elements within the briquet.

The briquet composition of the instant invention should provide flavor producing combustion for approximately 10 hours prior to achieving complete combustion and leaving only a hard ceramic shell. Once complete combustion has occurred, the ceramic shell will no longer be able to impart aromatic smell and flavor to food being grilled but will serve as a conventional lava rock-type of briquet. In this form, it will still provide some amount of flavor to the food being cooked due to juices dropping onto the shell and being vaporized into a smoke. However, if the enhanced flavor of the original briquets is desired, the fully combusted briquets, or a portion thereof, may be removed and replaced with new briquets.

Coal is not normally an element of the preferred embodiment of the combustible briquet since it is primarily a heat source for conventional charcoal briquets and is not required for a briquet to be utilized in a gas grill. However, as a matter of choice, anthracite or lignite coal may be included in the briquet composition of the instant invention as an auxiliary heat source. The preferred combustible briquet compositions described above will release about 6,000 B.t.u. of heat versus about 10,000 B.t.u. for a conventional briquet. However, as observed, the briquet is not the sole source of heat in a gas grill and the additional B.t.u. are not required for satisfactory barbecue grilling thereon.

Of interest, as a briquet of the present invention is burned it will turn in color from an original dark brown appearance to an intermediate black appearance due to oils or volatiles being driven from the charcoal (or charcoal and wood) to the outer surface of the briquet during combustion. Finally, the briquet will assume an orange or ceramic look when all of the combustibles in the original briquet have been fully burned. As noted earlier, in this form the briquet may serve to function as a conventional lava rock-type of briquet such as those presently utilized in gas grills.

Applicant has found that the briquet can be further hardened, if desired, by adding between about 10 percent to 20 percent by weight, preferably about 15 percent weight, of a hydraulic cement such as Portland cement. This enhances the performance of the fully combusted briquet as a lava rock-type of briquet. Applicant has also found that, as a matter of choice, a small amount of starch can be added to the briquet composition of the present invention in order to enhance the adhesiveness of the briquet between the time it is removed from the press until it has dried. About 1 percent to 15 percent by weight of a starch or binder such as corn starch, wheat starch and potato starch may be utilized if the additional adhesiveness is desired in the manufacture of applicant's novel briquet.

For a still fuller understanding of the invention, a typical chemical composition (moisture free) of one preferred clay carrier, hydrated montmorillonite, is set forth below:

| | |
|---|---|
| Silica | 56.00–59.00% as $SiO_2$ |
| Alumina | 18.00–21.00% as $Al_2O_3$ |

| | |
|---|---|
| Iron (Ferric) | 5.00–8.50% as $Fe_2O_3$ |
| Iron (Ferrous) | 0.37–0.65% as FeO |
| Magnesium | 3.00–3.30% as MgO |
| Sodium & Potassium | 0.84–1.25% as $Na_2O$ |
| Calcium | 1.20–3.50% as CaO |
| Titanium | 0.80–0.86% as $TiO_2$ |
| Carbon | 0.45–1.20% as $CO_2$ |
| Sulfur | 0.09–0.16% as $SO_2$ |
| Crystal Water | 5.00–6.00% as $H_2O$ |

Montmorillonite clay is represented by the chemical formula $AL_4O_3\ 4SiO_2\ H_2O$ and can be obtained from a number of suppliers (including Edward Lowe Industries, Inc. of South Bend, Ind.) in a form which can be processed on conventional briquet manufacturing equipment to create the briquet of the instant invention. The moisture content of the montmorillonite clay as shipped from the supplier is about 5 to 10 percent.

One of the most important characteristics of the combustible briquet composition described herein is the ability of the briquet to provide charcoal or charcoal and wood flavor to food being grilled thereon without ashes flaking therefrom as the flavor producing material is combusted. By incorporating a clay as a carrier for the flavor producing material, the briquet will maintain its shape during combustion of the flavor producing material contained therein and serve as a conventional lava rock-type of briquet thereafter.

It is evident from the foregoing description that suitable changes may be made without departing from the spirit of the present invention, wherefore it is intended that the patent shall cover, by suitable expression in the pending claims, the features of patentable novelty residing in the invention.

I claim:

1. A partially combustible briquet having good flavor producing characteristics and which does not shed ash as it burns, consisting essentially of from about 40 percent to 80 percent by weight of clay, and from about 20 percent to 60 percent by weight of at least one combustible flavor producing material.

2. A partially combustible briquet according to claim 1 wherein said clay is a member selected from the group consisting of montmorillonite, bentonite, kaolinite, ball clay, and mixtures thereof.

3. A partially combustible briquet according to claim 1 wherein said combustible flavor producing material is a carbonaceous material selected from the group consisting of charcoal, coal, and mixtures thereof.

4. A partially combustible briquet according to claim 1 wherein said combustible flavor producing material is a fibrous material selected from the group consisting of oak, hickory, mesquite, maple, alder, cherry, sassafras, spice hulls, nutshells, spices, and mixtures thereof.

5. A partially combustible briquet according to claims 3 and 4 wherein said combustible flavor producing material is a mixture of said carbonaceous material and said fibrous material.

6. A partially combustible briquet having good flavor producing characteristics and which does not shed ash as it burns, consisting essentially of about 50 percent by weight of a clay selected from the group consisting of montmorillonite, bentonite, kaolinite, ball clay, and mixtures thereof, and about 50 percent by weight of a carbonaceous material selected from the group consisting of charcoal, coal, and mixtures thereof.

7. A partially combustible briquet according to claim 6 wherein said carbonaceous material is charcoal.

8. A partially combustible briquet having good flavor producing characteristics and which does not shed ash as it burns, consisting essentially of about 50 percent by weight of a clay selected from the group consisting of montmorillonite, bentonite, kaolinite, ball clay, and mixtures thereof, about 25 percent by weight of a carbonaceous material selected from the group consisting of charcoal, coal, and mixtures thereof, and about 25 percent by weight of a fibrous material selected from the group consisting of oak, hickory, mesquite, maple, alder, cherry, sassafras, spice hulls, nutshells, spices, and mixtures thereof.

9. A partially combustible briquet according to claim 8 wherein said carbonaceous material is charcoal.

10. A partially combustible briquet according to claim 8 wherein said fibrous material is hickory.

11. A partially combustible briquet according to claim 10 wherein said hickory is sawdust.

12. A partially combustible briquet having good flavor producing characteristics and which does not shed ash as it burns, consisting essentially of about 40 percent to 80 percent by weight of clay, from about 20 percent to 60 percent by weight of at least one combustible flavor producing material, and from about 10 percent to 20 percent by weight of a hydraulic cement.

13. A partially combustible briquet according to claim 12 wherein said clay is a member selected from the group consisting of montmorillonite, bentonite, kaolinite, ball clay, and mixtures thereof.

14. A partially combustible briquet according to claim 12 wherein said combustible flavor producing material is a carbonaceous material selected from the group consisting of charcoal, coal, and mixtures thereof.

15. A partially combustible briquet according to claim 12 wherein said combustible flavor producing material is a fibrous material selected from the group consisting of oak, hickory, mesquite, maple, alder, cherry, sassafras, spice hulls, nutshells, spices, and mixtures thereof.

16. A partially combustible briquet according to claims 14 and 15 wherein said combustible flavor producing material is a mixture of said carbonaceous material and said fibrous material.

17. A partially combustible briquet according to claim 12 wherein said hydraulic cement is Portland cement.

18. A partially combustible briquet having good flavor producing characteristics and which does not shed ash as it burns, consisting essentially of from about 40 percent to 80 percent by weight of clay, from about 20 percent to 60 percent by weight of at least one combustible flavor producing material, and about 1 to 15 percent by weight of a starch binder.

19. A partially combustible briquet according to claim 18 wherein said clay is a member selected from the group consisting of montmorillonite, bentonite, kaolinite, ball clay, and mixtures thereof.

20. A partially combustible briquet according to claim 18 wherein said combustible flavor producing material is a carbonaceous material selected from the group consisting of charcoal, coal, and mixtures thereof.

21. A partially combustible briquet according to claim 18 wherein said combustible flavor producing material is a fibrous material selected from the group consisting of oak, hickory, mesquite, maple, alder, cherry, sassafras, spice hulls, nutshells, spices, and mixtures thereof.

22. A partially combustible briquet according to claims 20 and 21 wherein said combustible flavor producing material is a mixture of said carbonaceous material and said fibrous material.

23. A partially combustible briquet having good flavor producing characteristics and which does not shed ash as it burns, consisting essentially of about 40 percent to 80 percent by weight of clay, from about 20 percent to 60 percent by weight of at least one combustible flavor producing material, from about 10 percent to 20 percent by weight of a hydraulic cement, and from about 1 to 15 percent by weight of a starch binder.

24. A partially combustible briquet according to claim 23 wherein said clay is a member selected from the group consisting of montmorillonite, bentonite, kaolinite, ball clay, and mixtures thereof.

25. A partially combustible briquet according to claim 23 wherein said combustible flavor producing material is a carbonaceous material selected from the group consisting of charcoal, coal, and mixtures thereof.

26. A partially combustible briquet according to claim 23 wherein said combustible flavor producing material is a fibrous material selected from the group consisting of oak, hickory, mesquite, maple, alder, cherry, sassafras, spice hulls, nutshells, spices, and mixtures thereof.

27. A partially combustible briquet according to claims 25 and 15 wherein said combustible flavor producing material is a mixture of said carbonaceous material and said fibrous material.

28. A partially combustible briquet according to claim 23 wherein said hydraulic cement is Portland cement.

29. A partially combustible briquet having good flavor producing characteristics and which does not shed ash as it burns, comprising at least 40 percent by weight of clay and at least 40 percent by weight of at least one combustible flavor producing material.

30. A partially combustible briquet according to claim 29 including at least 5 percent by weight of hydraulic cement.

31. A partially combustible briquet according to claim 29 including at least 5 percent by weight of a starch binder.

32. A partially combustible briquet according to claim 29 wherein said combustible flavor producing material is a carbonaceous material.

33. A partially combustible briquet according to claim 29 wherein said combustible flavor producing material is a fibrous material.

34. A partially combustible briquet according to claims 32 and 33 wherein said combustible flavor producing material is a mixture of said carbonaceous material and said fibrous material.

* * * * *